(12) United States Patent
Sundareswara et al.

(10) Patent No.: US 9,349,226 B2
(45) Date of Patent: May 24, 2016

(54) SYSTEMS AND METHODS FOR DETECTING FAULTS WITHIN OPERATIVE SUB-SYSTEMS OF A VEHICLE

(71) Applicant: THE BOEING COMPANY, Chicago, IL (US)

(72) Inventors: Rashmi N. Sundareswara, Los Angeles, CA (US); Tsai-Ching Lu, Wynnewood, PA (US); Franz David Betz, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/510,294

(22) Filed: Oct. 9, 2014

(65) Prior Publication Data

US 2016/0104329 A1   Apr. 14, 2016

(51) Int. Cl.
*G01M 17/00* (2006.01)
*G07C 5/02* (2006.01)
*G07C 5/08* (2006.01)

(52) U.S. Cl.
CPC ............. *G07C 5/02* (2013.01); *G01M 17/00* (2013.01); *G07C 5/08* (2013.01)

(58) Field of Classification Search
CPC ......... G07C 5/08; G07C 5/0808; G07C 5/085
See application file for complete search history.

(56) References Cited

U.S. PATENT DOCUMENTS

2006/0064291 A1*   3/2006   Pattipatti ............ G05B 23/0243
                                                            703/14

FOREIGN PATENT DOCUMENTS

WO   2013067461   5/2013

OTHER PUBLICATIONS

Babu, Shivrnath, "Towards Automatice Optimization of MapReduce Programs,", 2011.
Dean, Jeffrey, "MapReduce: Simplified Data Processing on Large Clusters," 2004.
Elsayed, Tamer, "Pairwise Document Similarity in Large Collections with MapReduce," Jun. 2008Proceedings of ACL-08: HLT, Sort Papers, pp. 265-268.
Reshef, David, "Detecting Novel Associations in Large Data Sets," Dec. 2011, vol. 334, Science Magazine, pp. 1518-1524.
Byington, Carl S., "Dynamic Signal Analysis and Neural Network Modeling for Prediction of Flight Control Actuators," American Helicopter Society 60th Annual Forum, Jun. 2004.
Byington, Carl S., "In-Line Health Monitoring System for Hydraulic Pumps and Motors," 2003 IEEE.
Dakos, Vasilis, "Spatial correlation as leading indicator of catastrophic shifts," Theor Ecol, 2010 vol. 3 pp. 163-174.
Ghidella, Jason, "Requirements-Based Testing in Aircraft Control Design,", American Institute of Aeronautics and Astronautics, 2005.

(Continued)

*Primary Examiner* — Michael D Lang
(74) *Attorney, Agent, or Firm* — Joseph M. Butscher; The Small Patent Law Group, LLC

(57) ABSTRACT

A vehicle may include at least one operative sub-system that includes at least one sensor configured to output one or more sensor signals related to the at least one operative sub-system. A fault detection system may be in communication with the operative sub-system(s). The fault detection system is configured to generate at least one early warning signal based on the one more sensor signals, and determine at least one derivative of the early warning signal(s).

17 Claims, 5 Drawing Sheets

(56) References Cited

OTHER PUBLICATIONS

Smith, Paul, "Analysis of Spread Spectrum Time Domain Reflectometry for Wire Fault Location," IEEE: Sensors Journal, vol. 5, No. 6, Dec. 2005.
Volponi, Allan J., Development of an Information Fusion System for Engine Diagnostics and Health Management, NASA/TM-2004-212924, 2004.
Scheffer, Marten, "Early-warning signals for critical transitions," Nature, vol. 461, Sep. 2009.
Furse, Cynthia, "Noise-Domain Reflectometry for Locating Wiring Faults," IEEE Transactions on Electromagnetic Compatibility, Feb. 2005.
Kobayashi, Takahisa, Application of a Bank of Kalman Filters for Aircraft Engine Fault Diagnostics, NASA/TM, 2003.
Simon, D., "Aircraft Turbofan Engine Health Estimation Using Contrained Kalman Filtering," NASA/TM, 2003.
Compton, Ryan, "Catastrophe Prediction via Estimated Network Autocorrelation", 2011.
Kobayashi, T., Hybrid Kalman Filter Approach for Aircraft Engine Fault Diagnostics,: Turbo Expo, Jun. 2003.

* cited by examiner

SYSTEMS AND METHODS FOR DETECTING FAULTS WITHIN OPERATIVE SUB-SYSTEMS OF A VEHICLE

BACKGROUND OF THE DISCLOSURE

Embodiments of the present disclosure generally relate to systems and methods for detecting faults or failures within one or more operative sub-systems of a vehicle.

Various vehicles include numerous electronics, hardware, and other sub-systems that are used during operation of the vehicles. For example, a typical aircraft includes numerous sub-systems (such as flight control systems, radar systems, air conditioning units, air intakes, blowers, electronics, and the like) positioned throughout the aircraft. At least some of the sub-systems may be vital to the performance or intended mission of the aircraft. For example, an airplane may include radar electronics in a forward portion of the fuselage and hydraulic and pneumatic systems throughout the fuselage. Various military aircraft include a broad suite of systems and electronics, many of which are mission and/or flight critical systems.

Operative sub-systems of a vehicle may be monitored over time to determine whether or not they are functioning properly. Physics or model-based methods may be used to monitor an operative sub-system. These types of methods attempt to understand the physical model of the operative sub-system and determine expected values in normal operating conditions. An alert may be output if sensor readings deviate from the expected values. For example, active channels of an aircraft elevator reactive controller may be monitored through the use of rules generated by a logic table that includes or is correlated with expected values. If a fault is detected, the model-based method may be directed to output a sequence of action items.

In another model-based method, state space models along with Kalman filtering are used to monitor an operative sub-system. However, in such a model-based method, a large number of channels are monitored, which may increase the complexity and cost of the systems. Further, when a component is changed or upgraded, new models typically need to be generated.

Operative sub-systems may be also be monitored through pattern recognition methods. However, pattern recognition methods for detecting faults typically require large amounts of training data in order to accurately detect faults. Further, when a system that is being monitored undergoes a change (such as a system upgrade), the pattern recognition model or method needs to be retrained.

Accordingly, a need exists for a system and method that efficiently detects faults within one or more operative sub-systems of a vehicle.

SUMMARY OF THE DISCLOSURE

Certain embodiments of the present disclosure provide a vehicle that may include at least one operative sub-system. The operative sub-system(s) may include at least one sensor configured to output one or more sensor signals related to the operative sub-system(s). A fault detection system may be in communication with the operative sub-system(s). The fault detection system is configured to generate at least one early warning signal based on the one more sensor signals, and determine at least one derivative of the early warning signal(s). The fault detection system may be configured to compare the derivative(s) to at least one fault threshold. The fault detection system may be further configured to detect at least one fault of the operative sub-system(s) in response to the derivative(s) crossing the fault threshold(s).

In at least one embodiment, the fault detection system may include an early warning signal monitoring unit that is configured to generate the early warning signal(s) based on the sensor signal(s). The fault detection system may also include an early warning signal derivative-determining unit that is configured to determine the derivative(s) of the early warning signal(s). The fault detection system may include a fault alert unit that is configured to output a fault alert signal in response to the derivative(s) crossing at least one fault threshold.

The derivative(s) may represent a rate of change of the early warning signal(s) with respect to time. The derivative(s) may correlate to a transition of the operative sub-system(s) from a stable operating state (such as a normal operating state) to an unstable operating state (such as a degraded, impaired, or non-functional operating state) when the derivative(s) crosses a fault threshold.

In at least one embodiment, the at least one operative sub-system may include a plurality of operative sub-systems, and the at least one sensor may include a plurality of sensors.

The fault detection system may be configured to generate the early warning signal(s) by determining one or both of a covariance matrix and a correlation matrix.

In at least one embodiment, the fault detection system is configured to determine a first time window having a first step size, generate the early warning signal(s) with respect to the first time window. The fault detection system may determine a second time window size having a second step size. The second time window size and the second step size may be the same sizes as the first time window size and the first step size, respectively. The fault detection system is further configured to determine the derivative(s) by subtracting a mean of a first product from a second product. The first product may be a product of the early warning signal(s) and a first sum that includes the second step size and the second window. The second product may be a product of the early warning signal(s) and a second sum that includes the second window size. In at least one embodiment, the first time window is at least four times the number of the at least one sensor.

Certain embodiments of the present disclosure provide a system that may include a fault detection system in communication with at least one sensor of at least one operative sub-system. The fault detection system is configured to generate at least one early warning signal based on one more sensor signals received from the sensor(s), and determine at least one derivative of the early warning signal(s).

Certain embodiments of the present disclosure provide a method of detecting at least one fault within a vehicle. The method may include receiving one or more sensor signals related to at least one operative sub-system of the vehicle, generating at least one early warning signal based on the sensor signal(s), determining at least one derivative of the early warning signal(s), comparing the derivative(s) to at least one fault threshold, and detecting the fault(s) in response to the derivative(s) crossing the fault threshold(s).

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for automatically detecting impending failures, errors, or other such faults in one or more operative sub-systems, such as those within a vehicle. The systems and methods are configured to detect transitions between operating states of one or more operative sub-systems. A transition between operating states may be used to indicate a failure, error, or other such fault within one or more operative sub-systems. As such, detection of such faults may indicate that one or more operative sub-systems are to be serviced or replaced.

Embodiments of the present disclosure provide systems and methods that are configured to detect faults within operative sub-systems that provide reliable data beyond merely monitoring individual sensors or channels of an operative sub-system. The systems and methods for detecting faults may not utilize models. As such, the systems and methods may be more efficient than those that otherwise utilize physic/model-based modeling when equipment is upgraded or changed. In contrast to model-based methods, embodiments of the present disclosure detect faults based on analysis of data alone, without the need for a model.

Embodiments of the present disclosure provide systems and methods for detecting faults within one or more operative sub-systems that monitor early warning signals. For example, a fault detection system is used to quickly and efficiently detect a transition between operating states. In at least one embodiment, a derivate of one or more early warning signals is used to detect a change in operating states of one or more operative sub-systems.

Embodiments of the present disclosure may be used to detect faults within one or more operative sub-systems of an aircraft, such as a commercial or military jet. While embodiments of the present disclosure may be used with aircraft, the systems and methods described may also be used with various other vehicles, such as land vehicles (for example, automobiles, locomotives, light rail trains, construction vehicles, military tanks, and the like), boats, submarines, and ships, aerospace vehicles, and the like.

Figure 1:
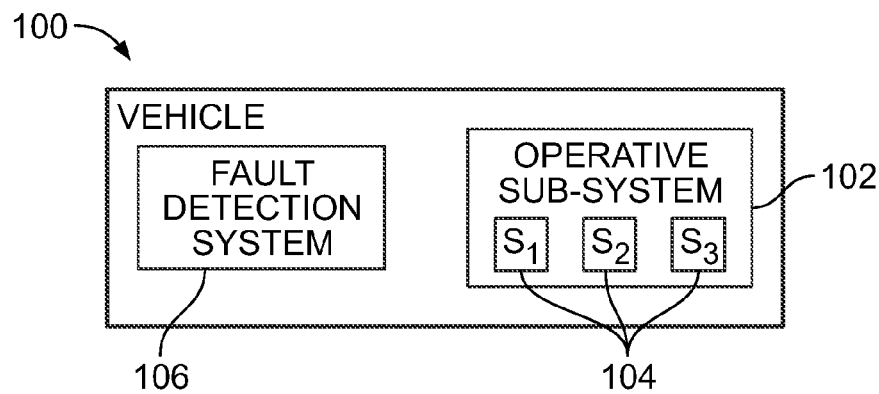
FIG. 1 illustrates a block diagram of a vehicle, according to an embodiment of the present disclosure.

FIG. 1 illustrates a block diagram of a vehicle 100, according to an embodiment of the present disclosure. The vehicle 100 may be an aircraft, such as a commercial or military jet, for example. Alternatively, the vehicle 100 may be a land-based vehicle, a boat or water-based vehicle, an aerospace vehicle, and/or the like.

The vehicle 100 may include at least one operative sub-system 102 located throughout, on, or within the vehicle 100. While the vehicle 100 is shown having one operative sub-system 102, the vehicle 100 may include more operative sub-systems 102 than shown. Each operative sub-system 102 may be an electronics, mechanical, or hardware sub-system. For example, if the vehicle 100 is an aircraft, the operative sub-system 102 may include a radar system, hydraulic system, pneumatic system, a flight control system, a navigation system, one or more communication systems, life support equipment, an ordnance delivery system (such as missile guidance systems), an air-conditioning system, a blower, an air intake system, and the like. If the vehicle 100 is an automobile, for example, the operative sub-system 102 may include a fuel-monitoring system, a tire pressure monitoring system, a navigation system, an engine control system, and/or the like. In short, the operative sub-system 102 may include any system, hardware, equipment, or the like that is to be monitored to determine whether the operative sub-system 102 is properly functioning.

The operative sub-system 102 may include a plurality of sensors 104 that are configured to sense one or more attributes, such as electrical attributes (for example, current or voltage outputs) of the operative sub-system 102. As shown, the operative sub-system 102 may include three sensors 104. Alternatively, the operative sub-system 102 may include more or less than three sensors 104. Each sensor 104 may be configured to determine the same or different attributes of the operative sub-system 102. For example, the sensors 104 may be configured to detect the output or detected current, voltage, or the like of the operative sub-system 102.

A fault detection system 106 is in communication with the sensors 104 of the operative sub-system 102. For example, the sensors 104 may be in communication with the fault detection system 106 through wired and/or wireless connections. The fault detection system 106 may be in communication with each sensor 104 through a respective communication channel, for example.

The fault detection system 106 is configured to receive signals from the sensors 104 and determine early warning signals based on the received signals. The fault detection system 106 may then monitor the derivative of the early warning signal, such as the rate of change of the early warning signals over time, to determine whether a transition has occurred. A detected transition may indicate a change in operating states, such as from a normal operating state to a degraded operating state. As such, a detected transition of one or more early warning signals may be used to indicate a fault in the operative sub-system. Upon detection of the transition, the fault detection system 106 may output an alert signal that indicates that a fault exists in the operative sub-system 102.

The fault detection system 106 may be or include one or more control units, circuits, or the like, such as processing devices that may include one or more microprocessors, microcontrollers, integrated circuits, and the like. The fault detection system 106 may also include memory, such as non-volatile memory, random access memory, and/or the like. The memory may include any suitable computer-readable media used for data storage. The computer-readable media are configured to store information that may be interpreted by the fault detection system 106. The information may be data or may take the form of computer-executable instructions, such as software applications, that cause a microprocessor or other such control unit within the fault detection system 106 to perform certain functions and/or computer-implemented methods. The computer-readable media may include computer storage media and communication media. The computer storage media may include volatile and non-volatile media, removable and non-removable media implemented in any method or technology for storage of information such as computer-readable instructions, data structures, program modules or other data. The memory and/or computer storage media may include, but are not limited to, RAM, ROM, EPROM, EEPROM, or other solid state memory technology, CD-ROM, DVD, or other optical storage, magnetic cassettes, magnetic tape, magnetic disk storage or other magnetic storage devices, or any other medium which may be used to store desired information and that may be accessed by components of the fault detection system 106.

Figure 2:
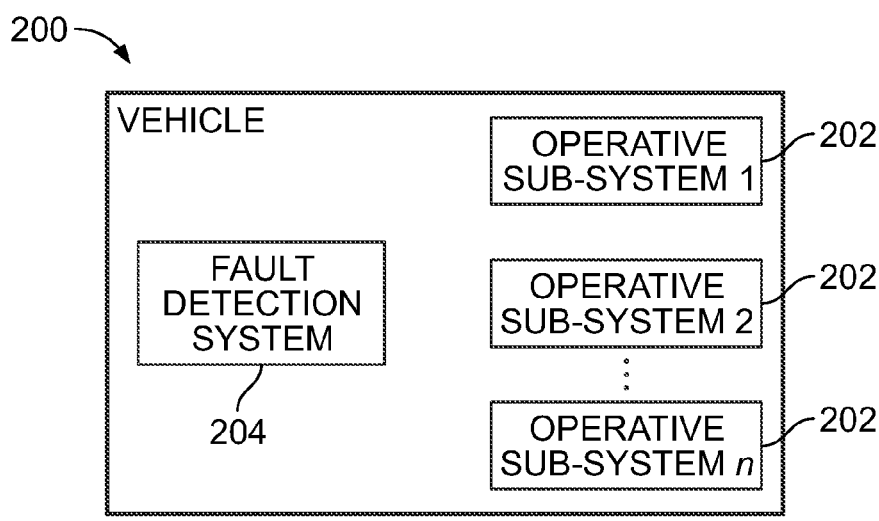
FIG. 2 illustrates a block diagram of a vehicle, according to an embodiment of the present disclosure.

FIG. 2 illustrates a block diagram of a vehicle 200, according to an embodiment of the present disclosure. The vehicle 200 includes a plurality of operative sub-systems 202, each of which may include one or more sensors, as described above. A fault detection system 204 is in communication with each of the sensors of each of the operative sub-systems 202. Thus, the fault detection system 204 may be configured to detect faults within multiple operative sub-systems 202. The fault detection system 204 may be used to detect faults in each of the operative sub-systems 202 and output alerts with respect to each operative sub-system 202. In at least one other embodiment, the fault detection system 204 may be configured to detect faults within the operative sub-systems 202, and determine an overall system fault, such as an overall fault of the vehicle 200, based on one or more faults within the operative sub-systems 202. For example, the operative sub-system 1 may be an air intake sub-system, while the operative sub-system 2 may be an air conditioning sub-system connected to the air intake sub-system. A fault in the air intake sub-system may affect the air conditioning sub-system. Accordingly, a fault in the air intake sub-system may suggest an impending fault in the air conditioning sub-system.

Figure 3:
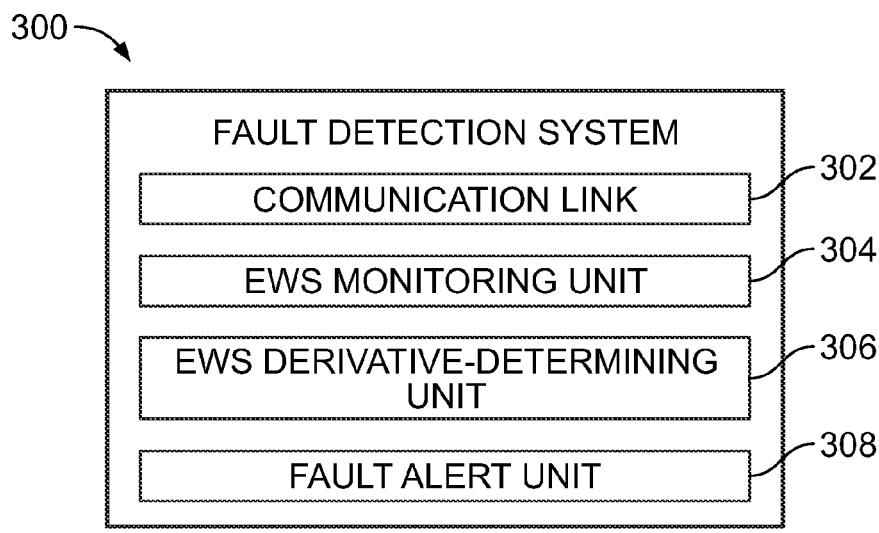
FIG. 3 illustrates a block diagram of a fault detection system, according to an embodiment of the present disclosure.

FIG. 3 illustrates a block diagram of a fault detection system 300, according to an embodiment of the present disclosure. The fault detection system 300 is an example of the fault detection systems 106 and 204, shown in FIGS. 1 and 2, respectively. The fault detection system 300 may include a communication link 302 (such as a transceiver, input/output port, wired connection, and/or the like), an early warning signal (EWS) monitoring unit 304, an EWS derivative-determining unit 306, and a fault alert unit 308. The EWS monitoring unit 304, the EWS derivative-determining unit 306, and the fault alert unit 308 may be separate and distinct components. Alternatively, each may be part of a single processing unit. For example, the EWS monitoring unit 304, the EWS derivative-determining unit 306, and the fault alert unit 308 may be separate and distinct electronic modules within a computer, processor, microcontroller, integrated chip, and/or the like.

The fault detection system 300 may be or include one or more processors, memories, and the like. For example, the fault detection system 300 may be or include a computer onboard a vehicle. Optionally, the fault detection system 300 may be remotely located from the vehicle.

The communication link 302 may be a wired or wireless input/output port that is in communication with sensors of one or more operative sub-systems, such as those described above with respect to FIGS. 1 and 2. The communication link 302 is configured to receive sensor signals from the sensors of the operative sub-system(s).

The received sensor signals are analyzed by the EWS monitoring unit 304, which determines one or more early warning signals based on the sensor signals. Regarding early warning signals, there is a quantifiable relation between a network of interacting variables of a system and emergent patterns. For example, the network of interacting variables may be or include variables, such as current or voltage, from one or more operative sub-systems. The currents or voltages detected by sensors may be output as the sensor signals. Quantitative indicators such as increased temporal correlation, skewness, and spatial correlations may exist among network interactions (such as interactions between components of a single operative sub-system, or one or more components of multiple operative sub-systems) at or near phase transitions, such as a transition from a normal operational state to a degraded operational state.

Each variable (or node of a network of interacting variables) in or of an operative sub-system has a stable or normal operating state. However, each variable may be influenced by a change in other variables. A combination of evolving dynamics, peer influence, and random perturbation leads to a network of stochastic differential equations. The coordination between the interactions may be captured in a covariance matrix of the interacting variables over a time window, and a leading eigenvalue may serve as a structure-invariant indicator of a transition. As such, by determining the covariance matrix (and optionally a correlation matrix, which may be the covariance matrix divided by a standard deviation of a time window over which the covariance matrix is computed) of selected features using a time window and taking a leading eigenvalue of the covariance matrix, information as to whether or not a state transition between a normal operating state and a degraded state arises.

The EWS derivative-determining unit 306 analyzes the one or more early warning signals to determine one or more transitions between operational states. The EWS derivative-determining unit 306 determines a derivate of one or more early warning signals. The derivative of the early warning signal(s) provides information as to whether an operative sub-system, multiple operative sub-systems, and/or a vehicle including one or more operative sub-systems are operating normally or abnormally. The derivative of the early warning signal(s) is used to detect when a change in state is significant enough to warrant an alert trigger, for example.

When the EWS derivative-determining unit 306 determines a derivative of the early warning signal(s) (for example, the rate of change of the early warning signal(s) with respect to time) that exceeds a particular threshold, the fault alert unit 308 may output a fault alert on a display, such as a monitor of a computer, workstation, or the like. For example, the fault alert unit 308 may output a graphic or video signal on a monitor of a computer indicating a fault. As another example, the fault alert unit 308 may output an audible fault signal through a speaker operatively connected to the fault detection system 300.

As noted above, the communication link 302 receives sensor signals from one or more operative sub-systems. The EWS monitoring unit 304 receives the sensor signals from the communication link 302 and analyzes the sensor signals to determine one or more early warning signals.

For example, the EWS monitoring unit 304 may select particular sensor signals to determine an early warning signal. Initially, the EWS monitoring unit 304 may determine a time window size w1. The EWS monitoring unit 304 may be programmed to determine a pre-set time window size w1. Alternatively, the EWS monitoring unit 304 may determine a time window size w1 based on an operational status of a vehicle. For example, the EWS monitoring unit 304 may set w1 to be a first value during a particular phase of operation of the vehicle, such as take-off of an aircraft, and a second value during another phase of operation of the vehicle, such as during cruising of the aircraft.

In at least one embodiment, the EWS monitoring unit 304 may set the time window size w1 to be at least four times the number of sensors that are in communication with the fault detection system 300. For example, if twenty sensors are in communication with the fault detection system 300, the time window size w1 may be eighty seconds. Alternatively, the EWS monitoring unit 304 may set the time window size w1 to be greater or less than four times the number of sensors that are in communication with the fault detection system 300.

After the EWS monitoring unit 304 determines the time window size w1, the EWS determination unit 304 determines one or more early warning signals, such as through a covariance matrix and/or correlation matrix, with respect to the current time window size w1, moving down the time series of all the selected sensors (or features) with a step size s1, until no more data is received through the communication link 302. The step size s1 may be a defined basic unit of the time window size w1. For example, the step size s1 may be one second. In at least one embodiment, the step size may be equal to a resolution of data. For example, if sensor data is sampled at 1 second, the step size does not exceed 1 second. Alternatively, the step size s1 may be greater or lesser than one second, depending on the data resolution. The EWS monitoring unit 304 outputs one or more early warning signals with respect to the one or more sensors that are being monitored as an EWS_result (or alternatively referred to as EWS-result).

After the EWS monitoring unit 304 determines the EWS_result, the EWS derivative-determining unit 306 may compute the derivative of the EWS_result. As noted, the derivative of the EWS_result is the rate of change of the EWS_result with respect to time (for example, dEWS_result/dt). If the derivate of the EWS_result exceeds a particular threshold, the EWS derivative-determining unit determines that a state transition has occurred (such as a transition between a stable, normal operating state and a degraded operation state), which may be indicated to an operator by way of the fault alert unit 308 outputting a fault signal.

In order to determine the derivative of the EWS_result, the EWS derivative-determining unit 306 may first identify a time window size w2, which may be shorter than the time window size w1. For example, the time window size w2 may be a quarter, a third, or a half of the time window size w1. In at least one embodiment, the step size w2 applies to the EWS signal and may be as small as a resolution of the EWS time-series, or as large as half the size of the entire EWS time-series.

Next, the EWS derivative-determining unit 306 may identify a threshold $\alpha$ for flagging deviations that are above or below a mean EWS within the time window w2. The threshold $\alpha$ may be adaptively determined. In at least one embodiment, the threshold $\alpha$ may be or equal three standard deviations of the last window mean EWS value. Alternatively, the threshold $\alpha$ may be greater or less than three standard deviations of the last window mean EWS value. In at least one other embodiment, the threshold $\alpha$ may be empirically determined, such as through prior analysis, logic tables, a priori knowledge, and/or the like.

The EWS derivative-determining unit 306 may determine the derivative of the EWS_result as follows:

$$\text{EWS\_derivative}(i) = \text{mean}(\text{EWS\_result}(i+w2)) - \text{mean}(\text{EWS\_result}(i+s2+w2))$$

where s2 is the step within the time window w2, and i is a position of the iterator through a sensor signal. Alternatively, the EWS-derivative may be computed through various other equations. If the EWS-derivative crosses (for example, passes above or below) the threshold $\alpha$, such as a noise threshold, the EWS derivative-determining unit 306 may flag the EWS-derivative at that particular time as an impending fault.

It has been found that taking the EWS-derivative to determine the existence of an impending fault is more accurate than simply analyzing the EWS_result by itself. The EWS-derivative provides formation as to a velocity of a state change or transition between operating states, such as a transition between a stable, normal operating state to an unstable, degraded state. The raw EWS_result may include noise and artifacts that lead to false alarms. In contrast, the EWS-derivative removes or disregards the noise. The EWS-derivative provides data as to significant changes, which relate to the threshold $\alpha$. Further, by comparing the EWS-derivative to the threshold $\alpha$, the fault detection system 300 does not need to monitor the EWS_result to determine if it is a certain value or not. As such, the fault detection system 300 may be used with vehicles or systems in which operative sub-systems are replaced, changed, or upgraded, as there is no need to base state transition determinations on raw early warning signal values.

Figure 4:
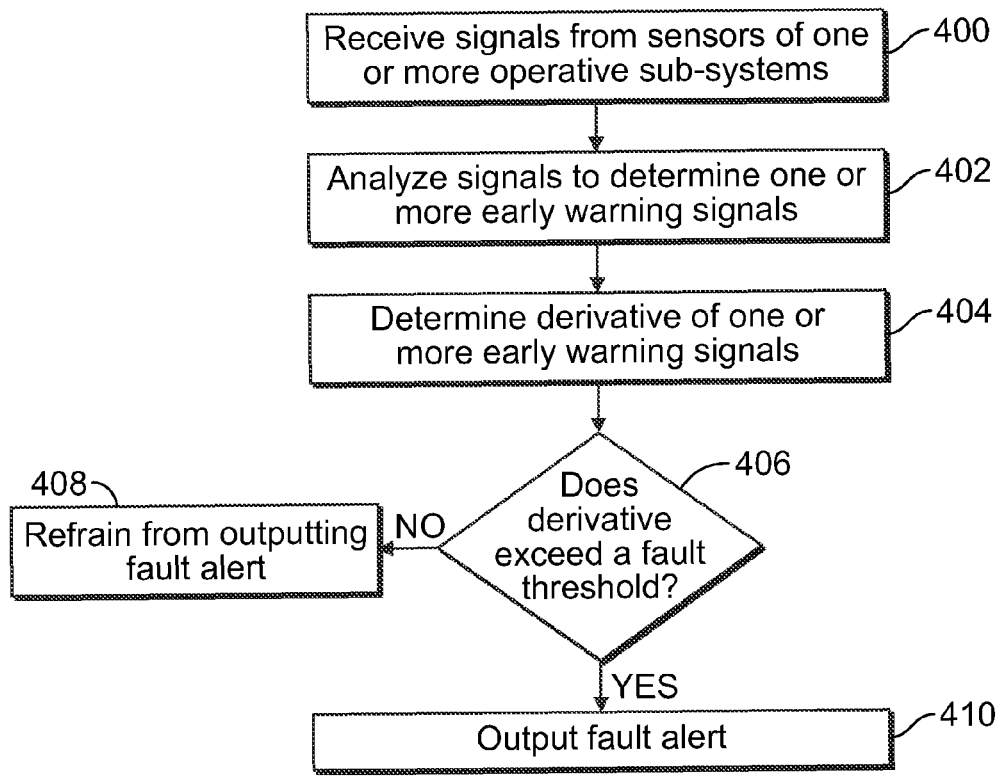
FIG. 4 illustrates a method of monitoring one or more operative sub-systems, according to an embodiment of the present disclosure.

FIG. 4 illustrates a method of monitoring one or more operative sub-systems, according to rut embodiment of the present disclosure. At 400, signals are received from sensors of one or more operative sub-systems. For example, a communication link of a fault monitoring system may receive the signals from one or more operative-sub-systems of a vehicle, such as an aircraft.

Next, at 402, the sensor signals are analyzed to determine one or more early warning signals. For example, an EWS determination monitoring unit may analyze the sensor signals to determine one or more early warning signals. The sensor signals may be from multiple sensors of a single operative sub-system. In at least one other embodiment, the sensor signals may be from sensors of multiple operative sub-systems. Multiple early warning signals may be determined for multiple operative sub-systems. In at least one other embodiment, a single early warning signal may be determined in relation to multiple operative sub-systems.

At 404, a derivative is determined with respect to the early warning signal(s). For example, an EWS derivative-determining unit may analyze the early warning signal(s) and determine the derivative(s) thereof.

Next, it is determined whether the derivative exceeds a fault threshold at 406. If not, the method proceeds to 408, in which no fault alert is output. If, however, the derivative does exceed the fault threshold at 406, the method proceeds to 410, in which a fault alert is output.

Figure 5:
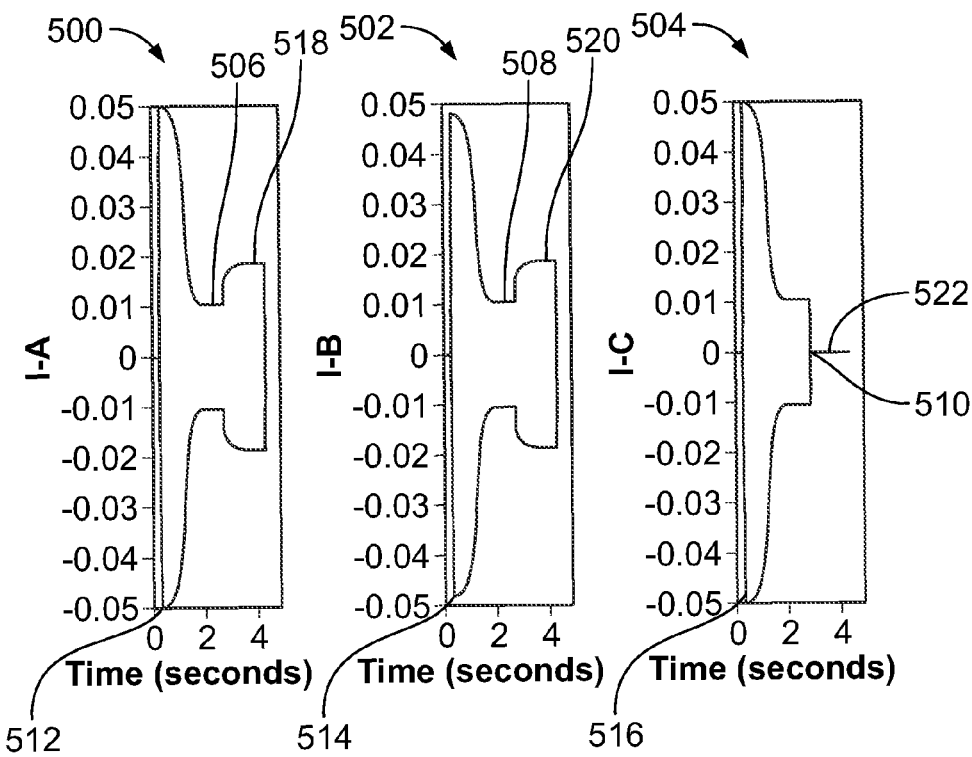
FIG. 5 illustrates graphs of current with respect to time for three sensors of an operative sub-system, according to an embodiment of the present disclosure.

FIG. 5 illustrates graphs of current with respect to time for three sensors 500, 502, and 504 of an operative sub-system, according to an embodiment of the present disclosure. The operative sub-system may be a blower, which may be used within a heating, ventilation, and air conditioning (HVAC) unit of an aircraft, for example. The operative sub-system is operated normally from time 0 until a time between 2 seconds and 3 seconds, at which point a circuit breaker is opened. As shown, the signals, in the form of current, output from the respective sensors 500, 502, and 504 transition from a stable operating state 512, 514, and 516, respectively, to an unstable operating state 518, 520, and 522, respectively, at transitions 506, 508, and 510 that correspond to the circuit breaker being opened.

Figure 6:
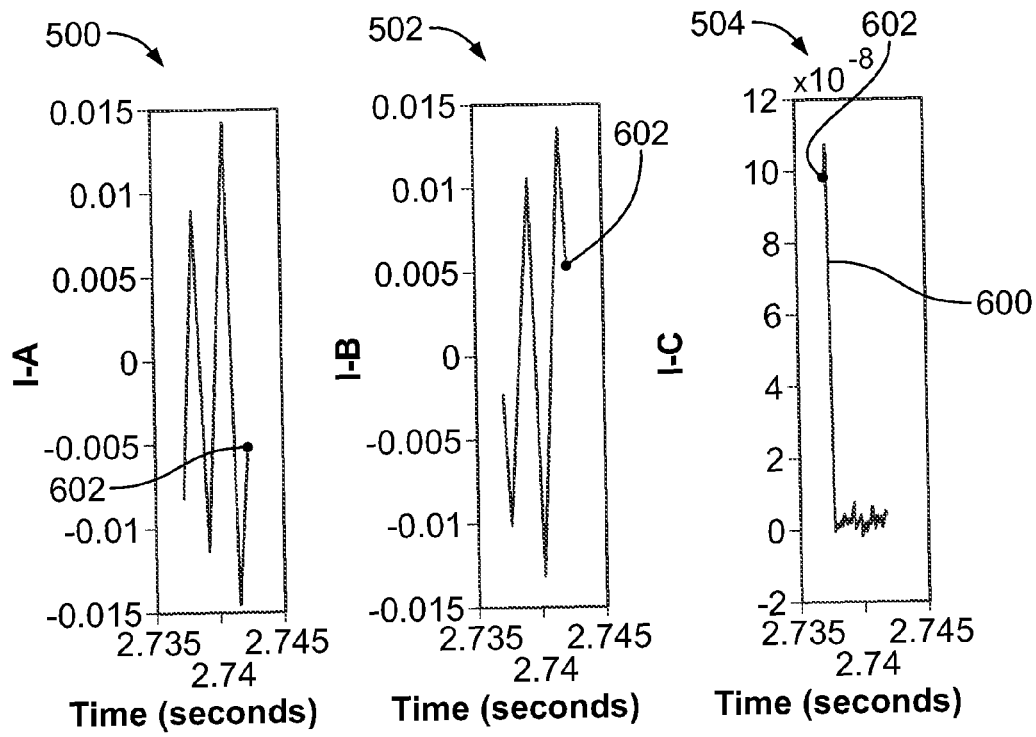
FIG. 6 illustrates zoomed-in graphs of current with respect to time for three sensors of an operative sub-system, according to an embodiment of the present disclosure.

FIG. 6 illustrates zoomed-in graphs of current with respect to time for the three sensors 500, 502, and 504 of the operative sub-system, according to an embodiment of the present disclosure. As shown in FIG. 6, in particular, between 2.735 seconds and 2.745 seconds, a prominent transition 600 appears in relation to the sensor 504. The transition 600 coincides with the opening of the circuit breaker.

As shown in FIGS. 5 and 6, two operating states exist. In particular, the stable operating state, represented by 512, 514, and 516, and the unstable operating state, represented by the 518, 520, and 522. The stable operating state transitions to the unstable operating state at 2.738 seconds, which represents the transition 602 to the unstable operating state.

A time window w1 of 50 seconds may be used, while a time window w2 of 10 seconds may be used. Steps s1 and s2 may each be 1 second. A fault threshold α of 0.001 may also be used.

Figure 7:
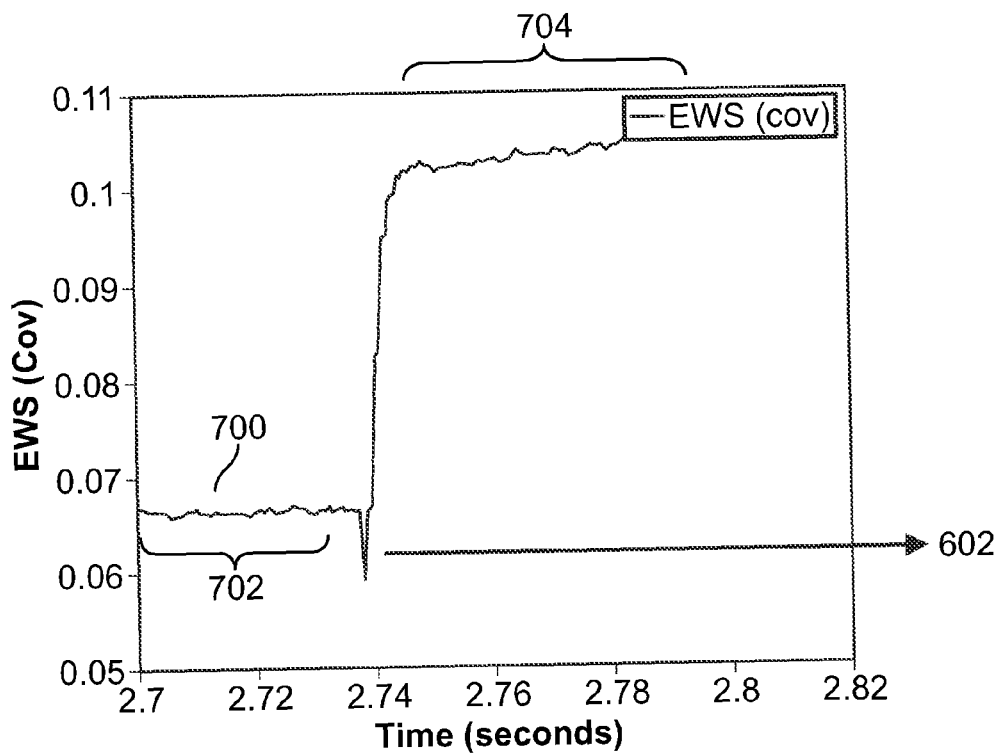
FIG. 7 illustrates a graph of an early warning signal for output current values of three sensors of an operative sub-system, according to an embodiment of the present disclosure.

FIG. 7 illustrates a graph of an early warning signal 700 for output current values of three sensors of an operative sub-system, according to an embodiment of the present disclosure. The early warning signal 700 is determined with respect to the current values received from all three sensors 500, 502, and 504, shown in FIGS. 5 and 6. As shown, the transition 602 occurs at 2.738 seconds. The normal, stable operating state 702 is evident before the transition 602, while the unstable operating state 704 occurs after the transition 602.

Figure 8:
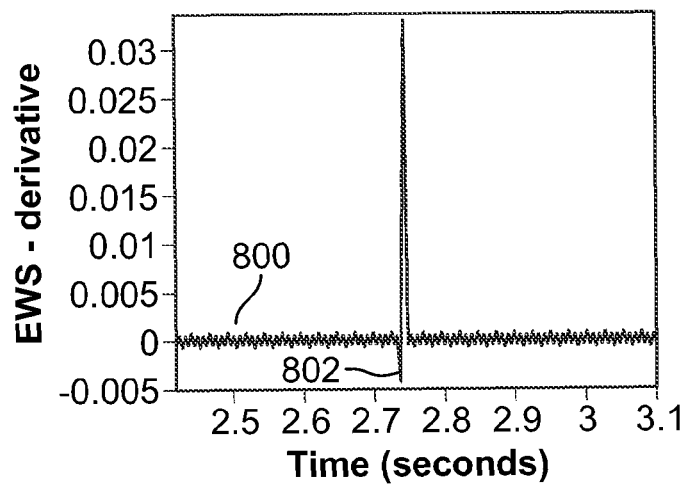
FIG. 8 illustrates a graph of a derivative of an early warning signal, according to an embodiment of the present disclosure.

FIG. 8 illustrates a graph of a derivative 800 of an early warning signal, according to an embodiment of the present disclosure. The derivative 800 is with respect to the early warning signal 700, shown in FIG. 7. As shown in FIG. 8, the derivative 800 shows a negative spike 802 at 2.738 seconds, indicating that the early warning signal has undergone a transition.

Figure 9:
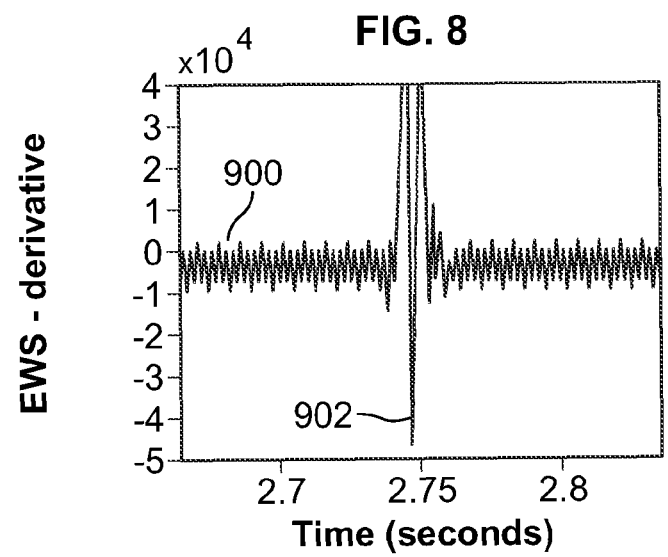
FIG. 9 illustrates a graph of a derivative of an early warning signal, according to an embodiment of the present disclosure.

FIG. 9 illustrates a graph 900 of a derivative of an early warning signal, according to an embodiment of the present disclosure. The derivative 900 is with respect to the early warning signal 700, shown in FIG. 7. As shown in FIG. 9, the derivative 900 shows a negative spike 902 at 2.738 seconds, indicating that the early warning signal has undergone a transition.

As shown in FIGS. 8 and 9, by taking the derivative 800 or 900, the transition 802 or 902 is prominently exposed. The transition 802 or 902 indicates an abrupt change in operating states. The transition 802 or 902 shows a significant crossing of the EWS=0 line. The threshold α may be 0.005 in relation to the EWS=0 line.

Figure 10:
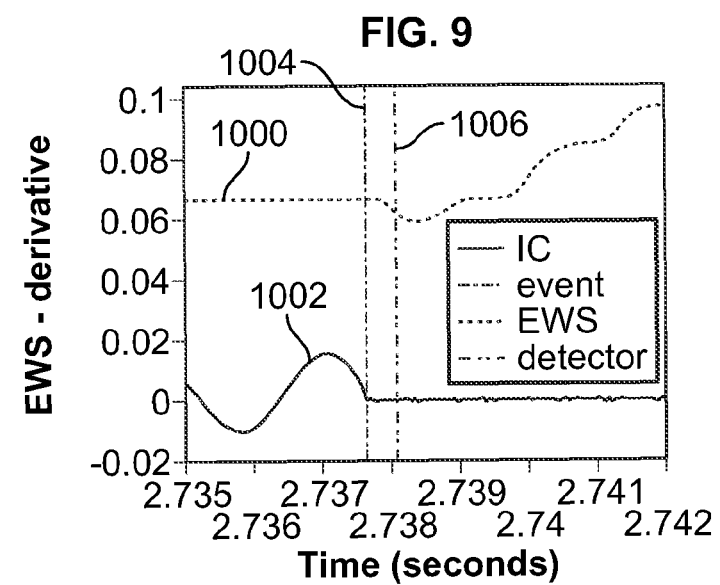
FIG. 10 illustrates a graph of signals transitioning between stable operating states and unstable operating states, according to an embodiment of the present disclosure.

FIG. 10 illustrates a graph of signals transitioning between stable operating states and unstable operating states, according to an embodiment of the present disclosure. An output signal 1000 and an EWS signal 1002 are detected and/or computed with respect to three current channels or sensors of an operative sub-system. An external event, such as a circuit breaker being opened, occurs at line 1004, causing a transition. The fault alert 1006 may then be output after the transition 1004 is detected. The operative sub-system operates at a stable operating state until the external event 1004, such as the opening of a circuit breaker, occurs. The fault alert 1006 is then output in response to the external event.

Figure 11:
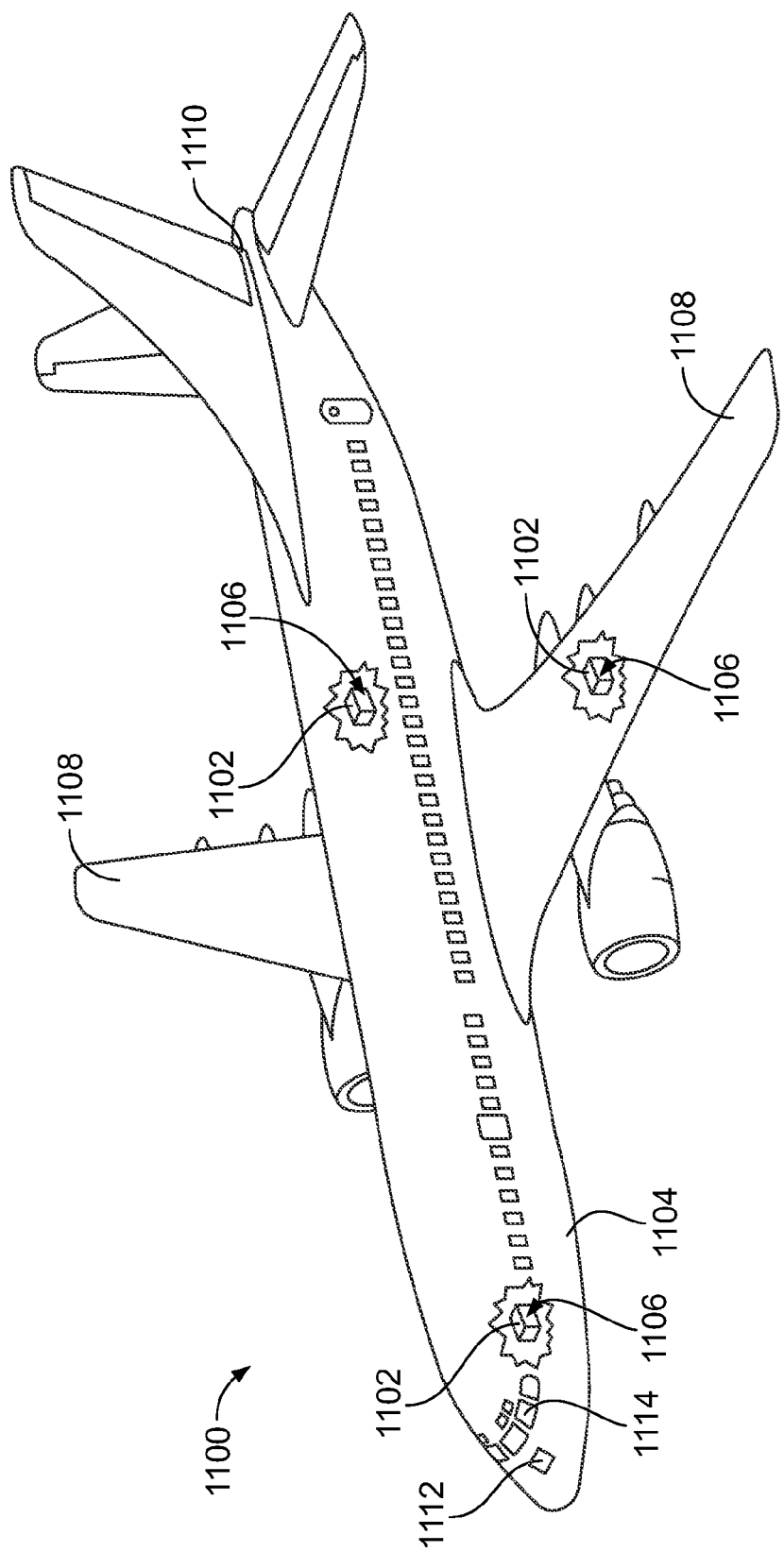
FIG. 11 illustrates a perspective view of an aircraft, according to an embodiment of the present disclosure.

FIG. 11 illustrates a perspective view of an aircraft 100, according to an embodiment of the present disclosure. The aircraft 1100 is an example of a vehicle that includes a plurality of operative sub-systems 1102. The aircraft 1100 includes a fuselage 1104. Operative sub-systems 1102 may be positioned throughout the fuselage 1104. Operative sub-systems 1102 may also be positioned at various areas of the aircraft 1100, including wings 1108, tail 1110, and the like. A fault detection system 1112 may be positioned within the aircraft, such that it may be accessible by a pilot within a cabin 1114. The fault detection system 1112 may be in communication with one or more sensors of each operative-sub-system 1102 throughout the aircraft 1100.

As described above, embodiments of the present disclosure provide systems and method for efficiently and accurately determining faults within one or more operative sub-systems of a vehicle, such as an aircraft. Embodiments of the present disclosure provide systems and methods that determine a derivative of an early warning signal. The derivative may be compared to a fault threshold to determine whether the one or more operative sub-systems are operating in an unstable state, such as an unsafe, degraded, or catastrophic state. The derivative(s) of the early warning signal(s) may be used to detect impending faults within a vehicle.

Embodiments of the present disclosure provide systems and methods that detect the emergence of impending faults with respect to data received from operative sub-systems of a vehicle, such as an aircraft. The embodiments may be model-free. As such, the systems and methods described with respect to FIGS. 1-11 are able to detect faults without using a new model every time an operative sub-system is replaced or upgraded.

As used herein, the term "computer," "control unit," "module," or the like may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "control unit," or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The diagrams of embodiments herein may illustrate one or more control units or modules. It is to be understood that the control units or modules represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more of a field programmable gate array (FPGA), application specific integrated circuit (ASIC), microprocessor(s), a quantum computing device, and/or the like. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation) to perform the task or operation. For the purposes of clarity and the avoidance of doubt, a general purpose computer is not "configured to" perform a task or operation unless or until specifically programmed or structurally modified to perform the task or operation.

The above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. §112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the clauses, and may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

What is claimed is:

1. A vehicle comprising:
at least one operative sub-system, wherein the at least one operative sub-system includes at least one sensor configured to output one or more sensor signals related to the at least one operative sub-system; and
a fault detection system in communication with the at least one operative sub-system, wherein the fault detection system is configured to:
determine a first time window having a first step size;
generate at least one early warning signal with respect to the first time window based on the one more sensor signals;
determine a second time window size having a second step size; and
determine at least one derivative of the at least one early warning signal by subtracting a mean of a first product from a second product, wherein the first product is the first product of the at least one early warning signal and a first sum that includes the second step size and the second window, and wherein the second product is the second product of the at least one early warning signal and a second sum that includes the second window size.

2. The vehicle of claim 1, wherein the fault detection system is further configured to compare the at least one derivative to at least one fault threshold.

3. The vehicle of claim 2, wherein the fault detection system is further configured to detect at least one fault of the at least one operative sub-system in response to the at least one derivative crossing the at least one fault threshold.

4. The vehicle of claim 1, wherein the fault detection system comprises:
an early warning signal monitoring unit that is configured to generate the at least one early warning signal based on the one or more sensor signals; and an early warning signal derivative-determining unit that is configured to determine the at least one derivative of the at least one early warning signal.

5. The vehicle of claim 4, wherein the fault detection system further comprises a fault alert unit that is configured to output a fault alert signal in response to the at least one derivative crossing at least one fault threshold.

6. The vehicle of claim 1, wherein the at least one derivative represents a rate of change of the at least one early warning signal with respect to time.

7. The vehicle of claim 1, wherein the at least one derivative correlates to a transition of the at least one operative sub-system from a stable operating state to an unstable operating state when the at least one derivative crosses a fault threshold.

8. The vehicle of claim 1, wherein the at least one operative sub-system comprises a plurality of operative sub-systems, and wherein the at least one sensor comprises a plurality of sensors.

9. The vehicle of claim 1, wherein the fault detection system is configured to generate the at least one early warning signal by determining one or both of a covariance matrix and a correlation matrix.

10. The vehicle of claim 1, wherein the first time window is at least four times the number of the at least one sensor.

11. A system comprising:
a fault detection system in communication with at least one sensor of at least one operative sub-system, wherein the fault detection system is configured to:
determine a first time window having a first step size;
generate at least one early warning signal with respect to the first time window based on one more sensor signals received from the at least one sensor;
determine a second time window size having a second step size; and
determine at least one derivative of the at least one early warning signal by subtracting a mean of a first product from a second product, wherein the first product is the first product of the at least one early warning signal and a first sum that includes the second step size and the second window, and wherein the second product is the second product of the at least one early warning signal and a second sum that includes the second window size.

12. The system of claim 11, wherein the fault detection system is further configured to compare the at least one derivative to at least one fault threshold, and detect at least one fault of the at least one operative sub-system in response to the at least one derivative crossing the at least one fault threshold.

13. The system of claim 11, wherein the fault detection system comprises:

an early warning signal monitoring unit that is configured to generate the at least one early warning signal based on the one or more sensor signals;
an early warning signal derivative-determining unit that is configured to determine the at least one derivative of the at least one early warning signal; and
a fault alert unit that is configured to output a fault alert signal in response to the at least one derivative crossing at least one fault threshold.

14. The system of claim 11, wherein the fault detection system is configured to generate the at least one early warning signal by determining one or both of a covariance matrix and a correlation matrix.

15. A method of detecting at least one fault within a vehicle, the method comprising:
receiving one or more sensor signals related to at least one operative sub-system of the vehicle;
generating at least one early warning signal based on the one more sensor signals, wherein the generating the at least one early warning signal comprises determining a first time window having a first step size, and generating the at least one early warning signal with respect to the first time window;
determining at least one derivative of the at least one early warning signal, wherein the determining the at least one derivative comprises determining a second time window size having a second step size, and determining the at least one derivative by subtracting a mean of a first product from a second product, wherein the first product is the first product of the at least one early warning signal and a first sum that includes the second step size and the second window, and wherein the second product is the second product of the at least one early warning signal and a second sum that includes the second window size;
comparing the at least one derivative to at least one fault threshold; and
detecting the at least one fault in response to the at least one derivative crossing the at least one fault threshold.

16. The method of claim 15, further comprising outputting a fault alert signal in response to the at least one derivative crossing at least one fault threshold.

17. The method of claim 15, wherein the detecting the at least one fault comprises correlating the at least one derivative with a transition of the at least one operative sub-system from a stable operating state to an unstable operating state when the at least one derivative crosses the at least one fault threshold.

* * * * *